(12) United States Patent
Janssen et al.

(10) Patent No.: US 7,214,338 B2
(45) Date of Patent: May 8, 2007

(54) METHOD AND DEVICE FOR PRODUCING AN ELECTRIC INSULATOR MADE FROM PLASTIC

(75) Inventors: Harald Janssen, Bamberg (DE); Raimund Hennings, Pettstadt (DE)

(73) Assignee: Trench Germany GmbH, Bamberg (DE)

( * ) Notice: Subject to any disclaimer, the term of this patent is extended or adjusted under 35 U.S.C. 154(b) by 382 days.

(21) Appl. No.: 10/474,314

(22) PCT Filed: Mar. 27, 2002

(86) PCT No.: PCT/DE02/01127

§ 371 (c)(1),
(2), (4) Date: Apr. 13, 2004

(87) PCT Pub. No.: WO02/081167

PCT Pub. Date: Oct. 17, 2002

(65) Prior Publication Data

US 2004/0159980 A1    Aug. 19, 2004

(30) Foreign Application Priority Data

Apr. 8, 2001 (DE) ................... 101 17 551
Apr. 30, 2001 (DE) ................... 101 21 236

(51) Int. Cl.
*B29C 45/14* (2006.01)
(52) U.S. Cl. ............... 264/275; 264/279; 264/DIG. 54; 425/125; 425/542
(58) Field of Classification Search .............. 264/261, 264/275, DIG. 54; 425/125, 451.9; 249/7
See application file for complete search history.

(56) References Cited

U.S. PATENT DOCUMENTS

| | | | | |
|---|---|---|---|---|
| 3,557,447 A | * | 1/1971 | Gruber et al. | 264/101 |
| 5,896,266 A | * | 4/1999 | Rubinski | 361/127 |
| 6,440,348 B1 | * | 8/2002 | Oppelt et al. | 264/279 |

FOREIGN PATENT DOCUMENTS

| | | |
|---|---|---|
| DE | 2 044 179 | 3/1972 |
| DE | 26 57 051 | 6/1978 |
| GB | 1 316 059 | 10/1971 |
| GB | 1316059 | * 5/1973 |
| GB | 1 549 049 | 7/1979 |
| SU | 843716 | 6/1981 |

* cited by examiner

*Primary Examiner*—Edmund H. Lee
(74) *Attorney, Agent, or Firm*—Barnes & Thornburg LLP

(57) ABSTRACT

A device including, and a method for producing, an electric insulator made of plastic, the insulator having a centrally arranged core made of glass fiber reinforced plastic, and having a plurality of insulation screens arranged coaxially around the core in an offset manner in an axial direction of the core. The method steps include: positioning a casting mold in an axial position around a vertically arranged core; producing a sealing connection between the core and the casting mold; injecting a liquid plastic material under pressure into an axial area of the casting mold; curing the liquid plastic material in the casting mold, thereby creating an insulation screen; deactivating the sealing connection; displacing the casting mold axially in a downward direction along a defined displacement path; and repeating the above steps until an insulator is produced having a desired number of insulation screens.

15 Claims, 3 Drawing Sheets

METHOD AND DEVICE FOR PRODUCING AN ELECTRIC INSULATOR MADE FROM PLASTIC

BACKGROUND

The present disclosure relates to a device including, and a method for producing, an electric insulator which is made of plastic and has a centrally arranged core or hollow core. The insulator may be made of a glass-fiber-reinforced plastic material and may have a plurality of insulation screens which are arranged coaxially around the core in an offset manner in the axial direction of the core.

A method as well as a pertaining device for producing a plastic insulator are known from German Patent Document DE-AS 2044179 and a counterpart British Patent No. 1,316,059. There, a casting mold, which is open at the top, is arranged coaxially around a centrally arranged and vertically positioned core. This casting mold is then filled by pouring in a liquid silicone mass. In this case, with respect to its cavity, the mold has a contour which corresponds to the desired insulation screen. After the hardening of the silicone mass, the casting mold is moved axially downward, specifically by the amount which corresponds to the desired axial spacing of two insulation screens. The individual insulation screens are cast in this manner.

A problem of the known method is that the silicone mass, from which the insulation screens are cast, should have a relatively low viscosity, particularly equal to or lower than 25,000 mPa*s. In order to obtain a surface of the insulation screens which is favorable with respect to the insulation, filling materials can be added to the silicone mass only to a very limited degree. This increases the costs of the material of the insulator considerably.

SUMMARY

Aspects of the present disclosure include a method and a pertaining device of a type such that it becomes possible to process more moderately priced plastic materials, particularly a silicone material, with a higher viscosity, and to cast insulation screens that are of a high quality. Furthermore, a shorter production time during the manufacturing of an insulator should be implemented by the method according to the present disclosure.

Another aspect is to reduce the average mold filling time by 60 to 80% in comparison to known methods.

A method of the present disclosure includes the following steps:

a) First, the casting mold for the casting of the insulation screens is placed in a defined axial position of the vertically arranged core or hollow core. In this case, the casting mold surrounds the core or hollow core with a coaxial opening which is arranged in an axially lower area of the casting mold. The casting mold has a mold area which is open at the top for forming an insulation screen.

b) Subsequently, a sealing connection is established between the core or hollow core, on the one hand, and the casting mold, on the other hand, in an axially lower area of the casting mold. This takes place, for example, by activating a seal.

c) Then a liquid plastic material is injected at a pressure which is increased with respect to the ambient pressure into an axial area of the casting mold which is situated axially above the sealing connection and axially below the upper end of the casting mold. This takes place until the casting mold is filled with a defined amount of the plastic material.

d) Subsequently, the plastic material is cured in the casting mold.

e) After the curing, the sealing connection between the core or hollow core and the casting mold is eliminated. In particular, a seal in the casting mold is deactivated.

f) Then the casting mold is displaced relative to the core or hollow core axially downward by a defined displacement path which corresponds to the axial spacing of the insulation screens.

g) Steps b) to f) are repeated until the desired number of insulation screens has been produced.

The injection of the plastic material takes place at an injection pressure which is at least 5 times the ambient pressure. The temperature of the casting mold may be adjusted, particularly by heating, at least during the curing step. Particularly when silicone is used as the plastic material, this heating takes place to at least 60° C.

According to the present disclosure, the device for producing the electric plastic insulator includes at least one injection element or injection duct for the pressure injection of liquid plastic material. The at least one duct is arranged between the lower end of the axially lower area and the upper end of the casting mold.

The injection element or the injection duct is preferably arranged in an axial area of the casting mold in which the core or hollow core in a coaxial opening of the casting mold rests closely against the casting mold. The economic efficiency of the production can be further improved in that several injection elements or injection ducts, preferably four, six or eight, are arranged in a uniformly distributed manner along the circumference of the casting mold.

A seal for sealing off the casting mold with respect to the core or hollow core may be arranged below the axial position of the injection elements or injection ducts. The seal can be activated and deactivated in a controllable manner. A pneumatic or hydraulic operation may be used. Finally, temperature-adjusting elements, particularly heating elements, can be arranged in the mold area of the casting mold which is open at the top.

The manufacturing of an insulation screen by the casting mold takes place such that the plastic material, particularly the silicone material, is fed at an increased pressure from below into the casting mold which is open at the top. This is in contrast to a known method, where the liquid plastic material is poured at an ambient pressure into the open casting mold from above.

Based upon the present disclosure:

- A moderately priced starting material can be used. A larger quantity of fillers can be added to the casting or silicone material, which lowers the total costs of the material.
- A liquid plastic material of a high viscosity can be processed without reducing the quality of the surface of the insulation screens. As a result of the pressure casting, it becomes possible to process plastic masses whose viscosity is clearly about 25,000 mPa*s, at least up to 85,000 mPa*s. In known methods, the casting or silicone material has had to be very liquid in order to be able to produce high-quality insulation screens.
- It is possible to use a casting or silicone material which has a shorter curing time, which reduces the production time for a plastic insulator and correspondingly increases the economic efficiency of the method.
- By the method of the present disclosure, seamless insulation screens without any burrs can be produced, in which case the casting or silicone material is applied directly to the central core.

DETAILED DESCRIPTION OF THE DRAWINGS

Figure 1:
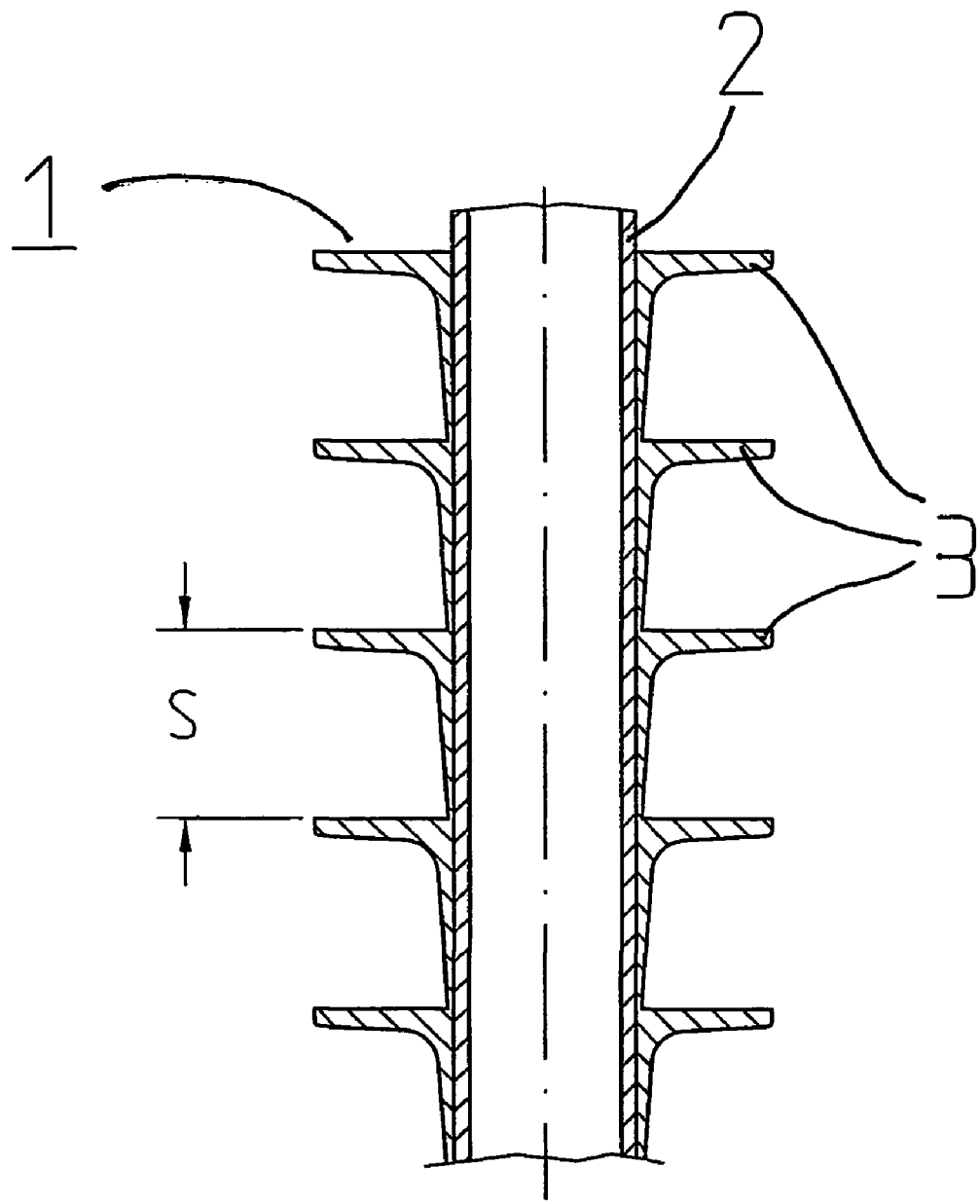
FIG. 1 is a schematic sectional view of a plastic insulator, according to the present disclosure.

FIG. 1 is a view of an electric plastic insulator 1. It includes a centrally arranged hollow core 2 around which insulation screens 3 are arranged in a coaxial manner. The core 2 may be made of glass fiber reinforced plastic. In this case, the screens 3 are each arranged at a constant mutual spacing S which corresponds to a defined axial displacement path of casting mold 4, shown in FIG. 2.

Figure 2:
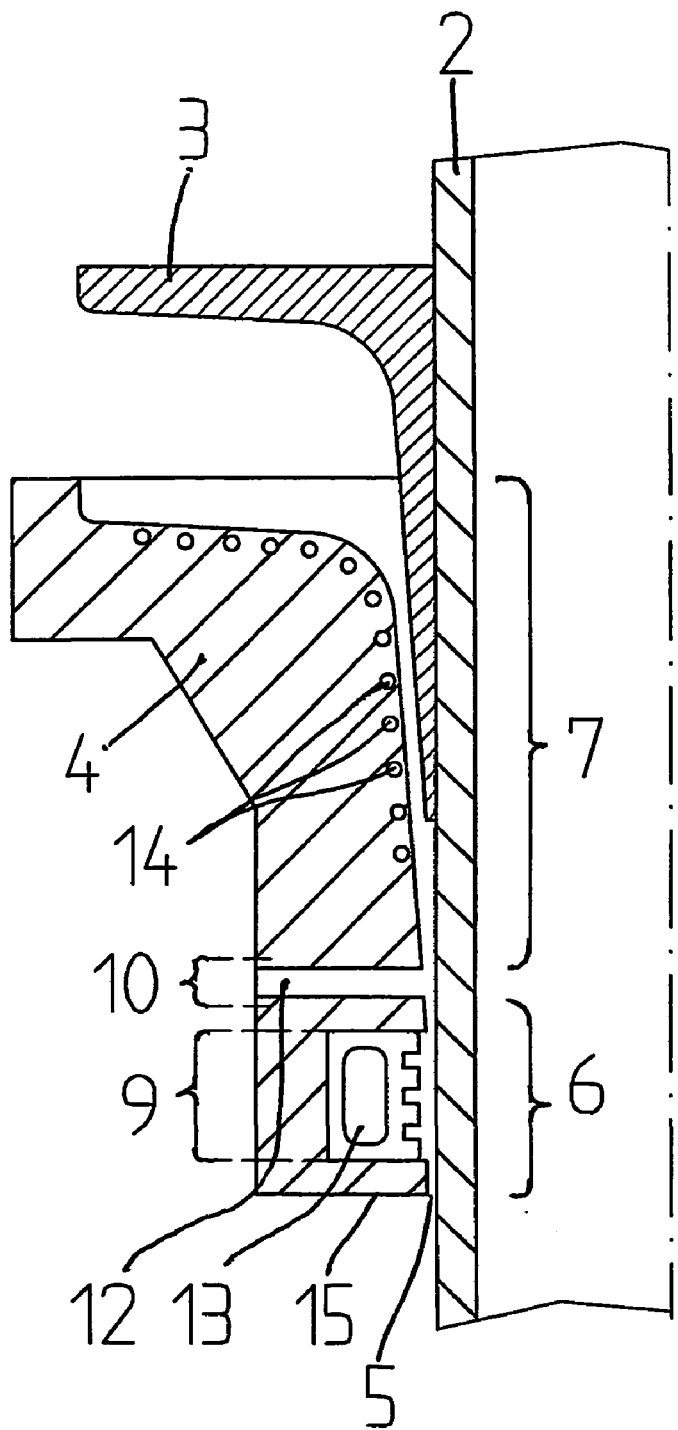
FIG. 2 is a sectional view of a casting device whose seal is not activated, according to the present disclosure.

FIG. 2 shows the centrally arranged hollow core 2 of the plastic insulator 1 whose longitudinal axis X is positioned vertically. The casting mold 4 is used for producing the individual insulation screens 3. The casting mold 4 has a coaxial opening 5 which reaches around the hollow core 2.

The casting mold 4 has an axially lower area 6 which is placed essentially with the coaxial opening 5 of the casting mold 4 closely around the hollow core 2. A mold area 7 of the casting mold 4, which is open at the top, extends axially above the lower area 6. This mold area 7 has a cavity C of the casting mold 4 which defines the shape of the insulation screen 3 to be cast.

When the hollow core 2 is arranged in a vertical manner, the casting mold 4 is moved downward (see double arrow P in FIG. 3) by moving elements which are not shown. After an insulation screen 3 has been created or manufactured, the casting mold 4 is moved via the axial displacement path S, as shown in FIG. 1, in a downward direction (as one views FIG. 1). During the movement, a seal 13 is deactivated (see FIG. 2). Seal 13 is provided in order to establish a fixed sealing connection 8 (see FIG. 3) between the casting mold 4 and the hollow core 2.

When the casting mold 4 has reached a desired axial position, it is applied to the hollow core 2 preferably by a buildup of an hydraulic or a pneumatic pressure on the seal 13, which may inflate the seal. As a result, the sealing connection 8 is established (see FIG. 3). In this case, the sealing connection 8 extends along axial area 9, which is illustrated in FIGS. 2 and 3.

Directly axially above the area 9 of the sealing connection 8, an injection element or injection duct 12 is arranged at or in an injection point or axial area 10. This area 10 is situated in an axial area of the casting mold 4 which is essentially placed closely around the hollow core 2. By way of the injection element or the injection duct 12, the liquid silicone mass, preferably with fillers, is injected into the casting mold 4. In this case, the mass may have a viscosity of at least up to 85,000 mPa*s which is a value considerably above the viscosity value of 25,000 mPa*s that has so far been considered to be an upper limit value. As a result, so-called LSR silicones (liquid silicone rubber) can be used which has not been possible by the previously known methods.

The injection of the silicone material takes place at an injection pressure Pe which is considerably above the ambient pressure P0. The injection pressure Pe is at least 5 times the ambient pressure Po.

Figure 3:
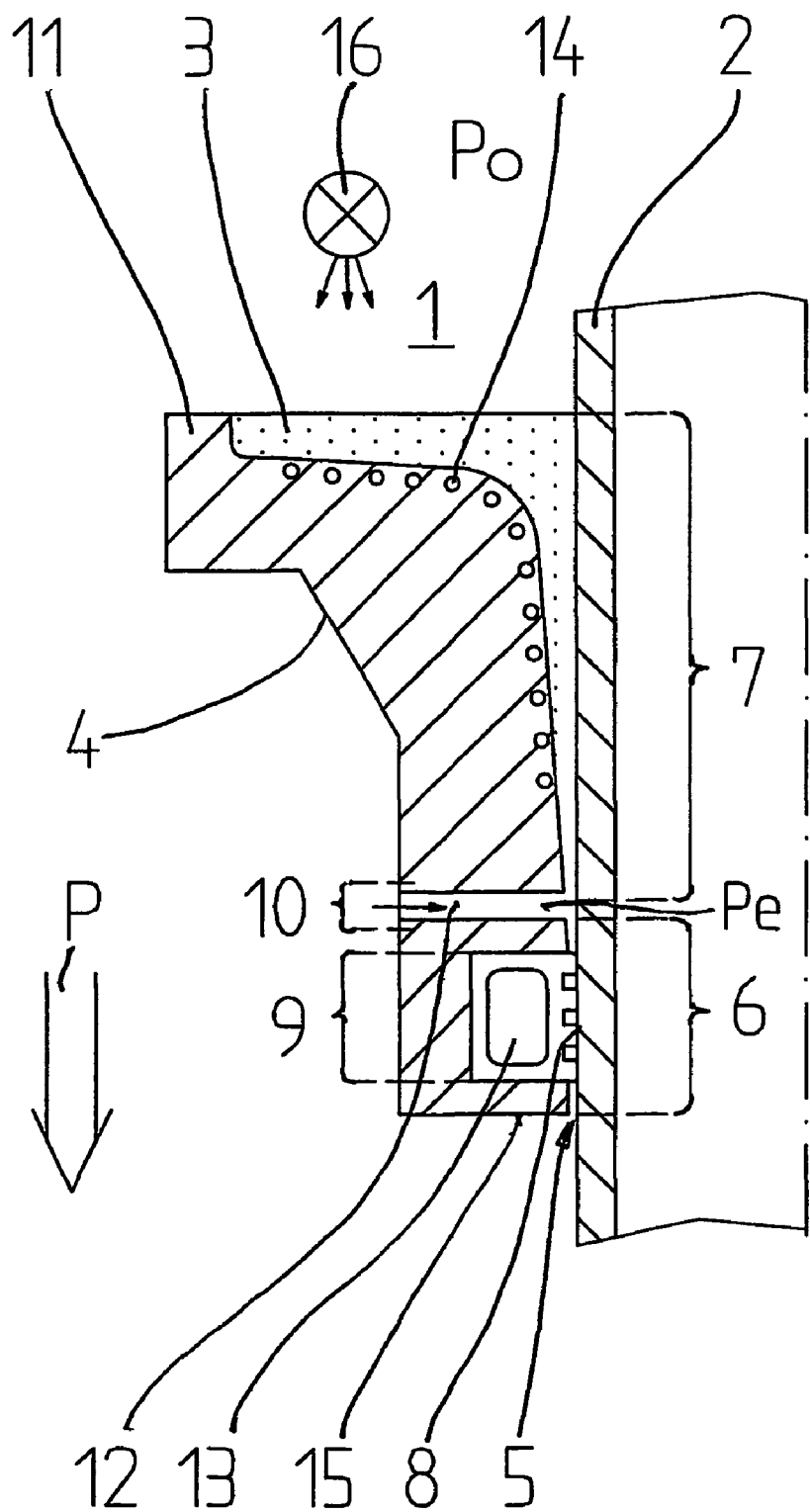
FIG. 3 is a sectional view of a casting device with an activated seal, according to the present disclosure.

Axial area 10, that is, the axial point at which the injection element or the injection duct 12 is arranged, is situated between a lower end 15 of the lower area 6 of the casting mold 4 and an upper end 11 (see FIG. 3).

For accelerating a curing process of the silicone mass, temperature-adjusting or heating elements 14 may be arranged in the casting mold 4 in the proximity of a wall of the cavity C, which heating elements 14 maintain a temperature of at least 60° C. during curing.

A plurality of injection elements or injection ducts 12 may be arranged in an equidistant manner along a circumference of the casting mold 4, which is not shown in FIGS. 1 to 3. Preferably four, six or eight injection elements or injection ducts 12 are used. The individual injection elements or injection ducts 12 may be supplied with silicone material by a coaxially arranged ring conduit (not shown).

A rotation of the casting mold 4, as known from the prior art, is not necessary in the case of the method according to the present disclosure. Because of the elimination of the mold rotation, the silicone can be fed via the injection elements or injection ducts 12. A heating, for example, by electricity, of the casting mold 4 can also be implemented. As a result of the seal 13, which can be activated and deactivated, the casting mold 4 can be axially moved because the seal 13 is not activated during movement.

A feeding path for the silicone mass, from its source to the injection element(s) or injection duct(s) 12 may be cooled in order to prevent a vulcanization (not shown).

One or more additional temperature-adjusting element(s) 16 may be arranged above the casting mold 4 (see FIG. 3). Such temperature element(s) may, for example, be an infrared lamp or lamps.

Instead of the above-described insulation screens 3 being made of silicone plastics, they may, for example, be made of weather-resistant synthetic resins.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

The invention claimed is:

1. A method for producing an electric insulator made of plastic, the insulator having a centrally arranged core, and having a plurality of insulation screens arranged coaxially around the core in an offset manner in an axial direction of the core, the steps comprising: positioning a casting mold in an axial position around a vertically arranged core, the casting mold having a coaxial opening arranged in an axially lower area of the casting mold, and having a mold area, open at the top, where an insulation screen is constructed;

producing a sealing connection between the core and the casting mold in an axially lower area of the casting mold;

injecting a liquid plastic material under pressure into an axial area of the casting mold until the casting mold is filled, such axial area being above the sealing connection and below an upper end of the casting mold;

curing the liquid plastic material in the casting mold, thereby creating an insulation screen;

deactivating the sealing connection;

displacing the casting mold axially in a downward direction along a defined displacement path; and repeating the above steps until an insulator is produced having a desired number of insulation screens.

2. The method according to claim 1, wherein the injection of the plastic material takes place at an injection pressure which is at least 5 times ambient pressure).

3. The method according to claim 1, wherein the casting mold is temperature adjusted, at least during curing.

4. The method according to claim 1, wherein the liquid plastic material is silicone, and the casting mold is heated to at least 60° C. during curing.

5. A device for producing an electric insulator comprising:
a casting mold to produce insulation screens, the casting mold being arranged concentrically around a vertically positioned core;
the casting mold including an axial lower area placed around the core, and an axial upper area that widens with respect to the lower area, and the upper area being adapted to a shape of the insulation screens to be produced; and
the casting mold further including at least one radially-oriented injection duct located between a lower end of the lower area and an upper end of the casting mold, the at least one radially-oriented injection duct being arranged to pressure inject liquid plastic material into the casting mold.

6. The device according to claim 5, wherein the at least one injection duct is arranged in an axial area) of the casting mold in which the core rests closely against the casting mold in a coaxial opening of the casting mold.

7. The device according to claim 5, wherein the casting mold includes at least four injection ducts arranged in a uniformly distributed manner along a circumference of the casting mold.

8. The device according to claim 5, wherein below an axial position of the at least one injection duct a seal is arranged for sealing off the casting mold with respect to the core.

9. The device according to claim 8, wherein the seal is activatable and deactivatable.

10. The device according to claim 9, wherein the seal is activatable at least one of pneumatically and hydraulically.

11. The device according to claim 5, wherein temperature-adjusting elements are arranged in the upper area of the casting mold, the casting mold being open at it's top.

12. The device according to claim 5, wherein at least one additional temperature-adjusting element is arranged above the casting mold.

13. The method according to claim 3, wherein the temperature adjustment includes heating.

14. The device according to claim 10, wherein the seal is activatable by inflation.

15. The device according to claim 11, wherein the temperature-adjusting elements include heating elements.

* * * * *